US012103308B2

(12) United States Patent
Takei

(10) Patent No.: US 12,103,308 B2
(45) Date of Patent: Oct. 1, 2024

(54) HEAD CLEANING DEVICE, HEAD CLEANING METHOD, AND IMAGE FORMING APPARATUS

(71) Applicant: KONICA MINOLTA INC., Tokyo (JP)

(72) Inventor: Ryusuke Takei, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 126 days.

(21) Appl. No.: 17/961,521

(22) Filed: Oct. 6, 2022

(65) Prior Publication Data

US 2023/0129041 A1 Apr. 27, 2023

(30) Foreign Application Priority Data

Oct. 25, 2021 (JP) ................................ 2021-173967

(51) Int. Cl.
*B41J 2/165* (2006.01)

(52) U.S. Cl.
CPC ................................ *B41J 2/16517* (2013.01)

(58) Field of Classification Search
CPC ........... B41J 2/16517; B41J 2002/1655; B41J 2025/008; B41J 2202/21; B41J 2/16535; B41J 2/16585
See application file for complete search history.

(56) References Cited

U.S. PATENT DOCUMENTS

2017/0253044 A1* 9/2017 Ohnishi .............. B41J 2/16535
2019/0077158 A1* 3/2019 Tsubaki ................ B41J 25/304

FOREIGN PATENT DOCUMENTS

JP 2011-148173 A 8/2011

* cited by examiner

*Primary Examiner* — Thinh H Nguyen
(74) *Attorney, Agent, or Firm* — Squire Patton Boggs (US) LLP

(57) ABSTRACT

A head cleaning device includes: a cleaning member that is long and comes into contact with nozzle surfaces of a first ejection head and a second ejection head arranged at intervals and cleans the nozzle surfaces; and a mover that moves, after completion of a previous cleaning and before start of a next cleaning, the cleaning member by a distance shorter than a path length from a portion that has cleaned the nozzle surface of the first ejection head to a portion that has cleaned the nozzle surface of the second ejection head up to the previous cleaning.

14 Claims, 12 Drawing Sheets

HEAD CLEANING DEVICE, HEAD CLEANING METHOD, AND IMAGE FORMING APPARATUS

The entire disclosure of Japanese patent Application No. 2021-173967, filed on Oct. 25, 2021, is incorporated herein by reference in its entirety.

BACKGROUND

Technological Field

The present disclosure relates to a head cleaning device that cleans a nozzle surface of an ejection head such as an inkjet head, an image forming apparatus including the head cleaning device, and a head cleaning method.

Description of the Related Art

In recent years, an inkjet printer that ejects ink from nozzles of an inkjet head to form an image on a recording medium has been utilized in a wide range of fields.

Such an inkjet printer generally includes a head cleaning device that wipes off dirt such as ink and dust adhering to a nozzle surface of the inkjet head (surface provided with nozzle openings of the inkjet head) with a cleaning member in a sheet form so that image quality does not deteriorate and unnecessary dirt does not adhere to a recording medium.

Conventionally, in a case where wiping the nozzle surfaces of a plurality of inkjet heads arranged at a predetermined interval in one direction with a cleaning member, before the next cleaning operation after performing cleanings of the plurality of inkjet heads at a predetermined timing, a portion of the cleaning member that has wiped off the inkjet head on the most upstream side in a moving direction of the cleaning member is wound by a predetermined length (hereinafter referred to as "one turn" for convenience) until moving to a position immediately downstream of the most downstream inkjet head by a winding device, and then the nozzle surface of each inkjet head is cleaned with an unused new portion of the cleaning member (for example, Japanese Patent Application Laid-Open No. 2011-148173).

However, when the cleaning member is wound by one turn for each time of head cleaning operation as described above, a portion not used for cleaning between two adjacent inkjet heads is wound without being used, and maintenance cost increases accordingly.

SUMMARY

The present disclosure has been made in view of the above-described problems, and an object thereof is to provide a head cleaning device capable of reducing maintenance cost, an image forming apparatus including the head cleaning device, and a head cleaning method.

To achieve the abovementioned object, according to an aspect of the present invention, a head cleaning device reflecting one aspect of the present invention comprises: a cleaning member that is long and comes into contact with nozzle surfaces of a first ejection head and a second ejection head arranged at intervals and cleans the nozzle surfaces; and a mover that moves, after completion of a previous cleaning and before start of a next cleaning, the cleaning member by a distance shorter than a path length from a portion that has cleaned the nozzle surface of the first ejection head to a portion that has cleaned the nozzle surface of the second ejection head up to the previous cleaning.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Embodiment (1) Overall Configuration of Image Forming Apparatus

First, a configuration of an image forming apparatus according to the present embodiment will be described.

Figure 1:
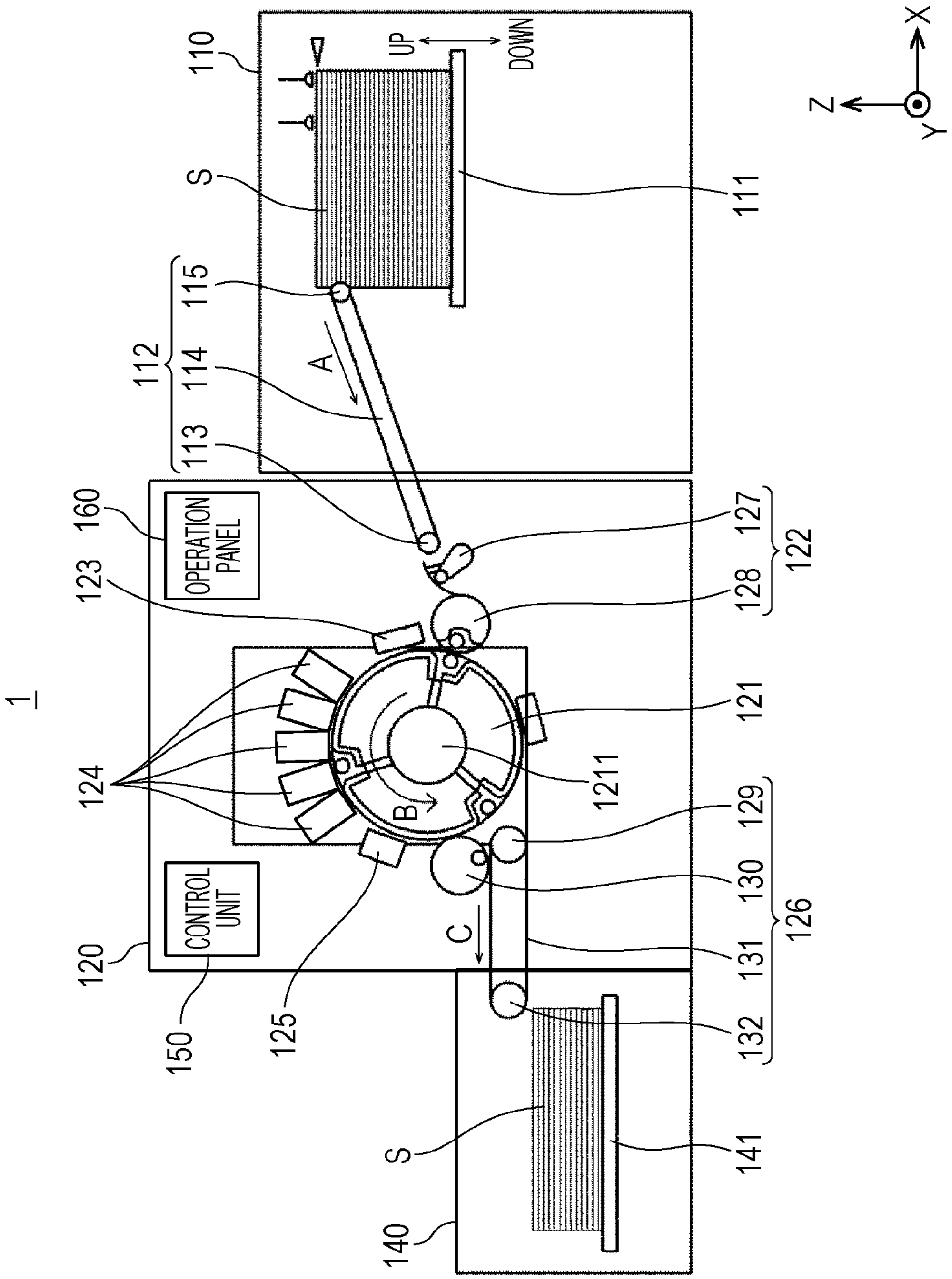
FIG. 1 is a diagram illustrating a main configuration of an image forming apparatus according to an embodiment of the present disclosure.

As illustrated in FIG. 1, the image forming apparatus 1 according to the present embodiment is what is called an inkjet printer, and includes a sheet feeding unit 110, an image former 120, a sheet ejection unit 140, a control unit 150, and an operation panel 160.

The sheet feeding unit 110 has a sheet feeding tray 111 and a conveyance unit 112. The sheet feeding tray 111 is a tray for placing a bundle of recording sheets S (recording media in a sheet form) used for image formation. As the recording sheet S, in addition to paper such as plain paper or coated paper, various media that allows fixation of ink landed on the surface, such as fabric or resin in a sheet form, can be used.

The sheet feeding tray 111 moves up and down according to the number of sheets of the sheet bundle, and moves to a position where the uppermost recording sheet S in the sheet bundle is fed by the conveyance unit 112.

The conveyance unit 112 uses a pickup roller, which is not illustrated, to feed the recording sheets S one by one from the top of the sheet bundle placed on the sheet feeding tray 111. The conveyance unit 112 has a sheet conveyance mechanism in which an endless conveyance belt 114 is wound around rollers 113 and 115.

The conveyance unit 112 conveys the recording sheet S to the image former 120 by rotationally driving the rollers 113 and 115 and causing the conveyance belt 114 to circulate in an arrow A direction in a state where the recording sheet S fed by the pickup roller is placed on the conveyance belt 114.

The image former 120 includes a conveyance drum 121, a transfer unit 122, a sheet heating unit 123, a head unit (ejection head) 124, a fixation unit 125, a delivery unit 126, and the like, and forms an image on the recording sheet S by an inkjet method.

The transfer unit 122 has a swing arm part 127 and a transfer drum 128. When the transfer unit 122 picks up the recording sheet S by holding one end of the recording sheet S conveyed by the conveyance unit 112 using the swing arm part 127, the transfer unit 122 transfers the recording sheet S to the transfer drum 128.

The transfer drum 128 transfers the recording sheet S to the conveyance drum 121 by guiding the recording sheet S along an outer peripheral surface of the conveyance drum 121.

Upon receiving the recording sheet S from the transfer unit 122, the conveyance drum 121 is rotationally driven in an arrow B direction in a state of carrying the recording sheet S on the cylindrical outer peripheral surface, thereby conveying the recording sheet S.

The conveyance drum 121 may have, for example, an intake hole on the outer peripheral surface, and may suck the recording sheet S onto the outer peripheral surface by sucking outside air from the intake hole. Further, a claw for retaining an end portion of the recording sheet S may be provided on the outer peripheral surface.

The conveyance drum 121 is rotationally driven by a conveyance drum rotation drive motor which is not illustrated. At the time of this rotational driving, the rotation angle of the conveyance drum 121 is adjusted so that the ink ejected by the inkjet head lands on a desired position on the recording sheet S.

The sheet heating unit 123 heats the recording sheet S carried on the outer peripheral surface of the conveyance drum 121 on a conveyance path of the recording sheet S from the transfer unit 122 to the head unit 124 so that the recording sheet S has a temperature in a predetermined range.

Thus, the sheet heating unit 123 is disposed to face the outer peripheral surface of the conveyance drum 121, and supplies power to an infrared heater or the like to radiate heat, thereby raising the temperature of the recording sheet S. The temperature of the recording sheet S is adjusted to be in the predetermined range by controlling the amount of power supplied to the infrared heater or the like.

The head unit 124 is disposed on the downstream side of the sheet heating unit 123 in a rotation direction of the conveyance drum 121. The head unit 124 includes a plurality of inkjet heads, and forms an image on the recording sheet S by ejecting ink from nozzles of the inkjet heads in synchronization with a conveyance situation of the recording sheet S by the conveyance drum 121.

Note that the head unit 124 may use a single-pass method in which nozzles are disposed over the entire effective image area of the recording sheet S along an axial direction of the conveyance drum 121, or may use a scanning method in which nozzles are disposed in a carriage that reciprocates along the axial direction of the conveyance drum 121 and ink is ejected while moving the carriage.

In a case of employing the scanning method, a carriage moving mechanism 170 (not illustrated in FIG. 1. See FIG. 3), at the time of image formation, the nozzle surface of the inkjet head is moved to a position (printing area) facing the outer peripheral surface of the conveyance drum 121.

Further, in order to allow landing of the ink at an appropriate position on the recording sheet S, a plurality of the head units 124 is disposed at positions where the distance from the ink ejection surface of the inkjet head to the outer peripheral surface of the conveyance drum 121 is appropriate.

In the present embodiment, inks of five colors of yellow (Y), magenta (M), cyan (C), black (K), and white (W) are used to form a color image. Thus, the five head units 124 corresponding to the inks of the five colors of YMCKW are disposed in order from the upstream side to the downstream side in the rotation direction of the conveyance drum 121 so as to be at equal intervals in a predetermined order along the outer peripheral surface of the conveyance drum 121.

Note that each head unit 124 has the same configuration except for the color of the supplied ink.

Figure 2A:
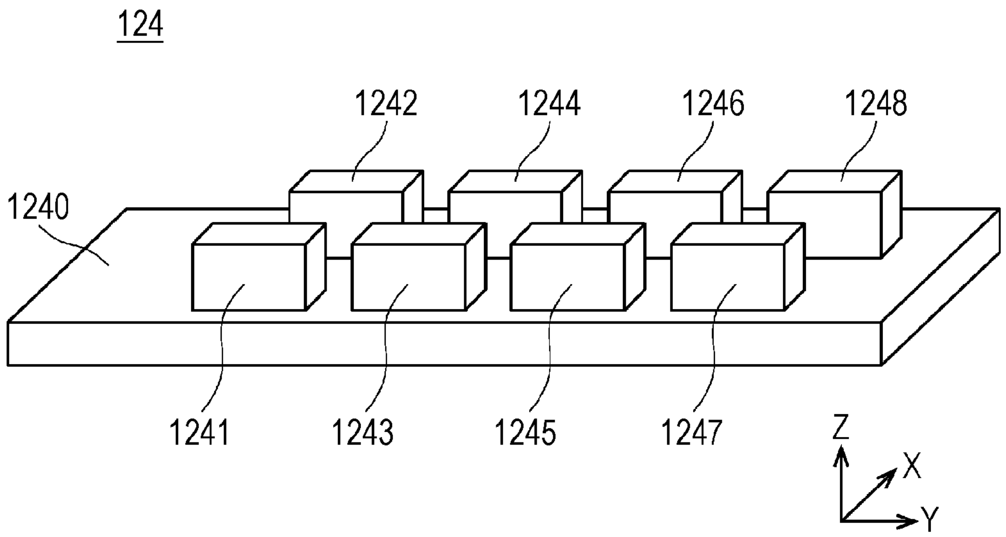
FIG. 2A is a perspective view illustrating a configuration of a head unit.

FIG. 2A is a perspective view schematically illustrating a configuration of one head unit 124.

As illustrated in the drawing, the head unit 124 is formed by mounting eight inkjet heads 1241 to 1248 on a carriage 1240 formed to be long in a direction (Y direction) orthogonal to a conveying direction of the sheet S.

Figure 2B:
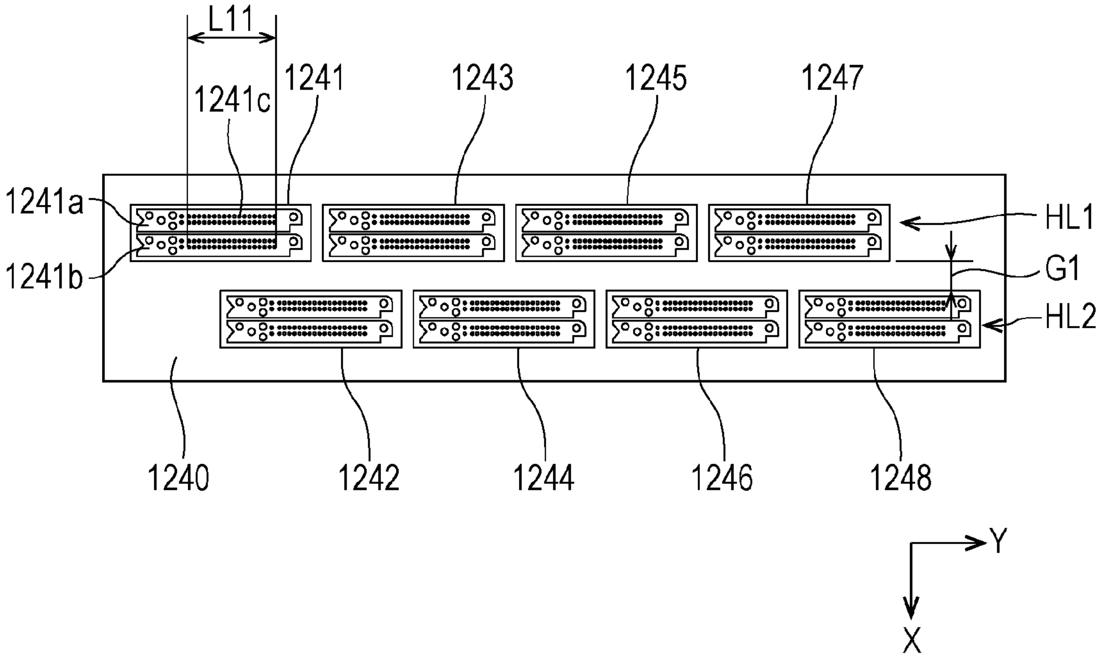
FIG. 2B is a schematic view of the head unit as viewed from below.

FIG. 2B is a schematic view of the head unit 124 as viewed from the side of the sheet S conveyed by the conveyance drum 121.

As illustrated in the drawing, for example, the inkjet head 1241 is formed by combining two inkjet head modules 1241*a* and 1241*b*, and their nozzle rows are arranged in parallel in the Y direction.

The inkjet head 1241 is mounted in a state where a surface (nozzle surface) in which a plurality of nozzles 1241*c* arranged in a row at a predetermined pitch in a Y axis direction is opened faces the sheet S conveyed by the conveyance drum 121 and is slightly projected and exposed to the lower surface side of the carriage 1240.

Each nozzle 1241*c* is provided with an actuator including a piezoelectric element which is not illustrated and a diaphragm, and is configured such that, when a voltage is applied to an electrode included in the piezoelectric element, the actuator is deformed and ink is ejected from each nozzle 1241*c*.

Since the other inkjet heads 1242 to 1248 also have the same configuration as the inkjet head 1241, the description thereof will be omitted.

Ahead row HL1 in which the inkjet heads 1241, 1243, 1245, and 1247 are arranged in a row and a head row HL2 in which the inkjet heads 1242, 1244, 1246, and 1248 are arranged in a row are each arranged in parallel to the Y direction with a predetermined gap G1 interposed therebetween in the X direction.

Note that, in the present embodiment, assuming that a length in the Y axis direction of the nozzle row in each inkjet head 1241 to 1248 is L11, each inkjet head in the head row HL1 and the head row HL2 is disposed to be shifted by L11 in the Y axis direction, and a plurality of nozzles in the respective inkjet heads of the head rows HL1 and HL2 is continuously arranged at equal pitches when viewed from an X axis direction.

By arranging the plurality of inkjet heads in this manner, a printing range in the Y axis direction (main scanning direction) by the head unit 124 can be lengthened, and the printing speed can be improved.

Further, the head row HL1 and the head row HL2 of the head unit 124 have the gap of G1 in the X direction.

However, the configuration of the head unit 124 is not limited to that of FIG. 2B.

Since the nozzle surface of each inkjet head 1241 to 1248 of the head unit 124 is contaminated by the ejection of ink, it is necessary to perform maintenance at a predetermined timing, and a head maintenance unit 200 for this purpose is arranged side by side on a front side (Y direction) of a paper surface of the conveyance drum 121 in FIG. 1 (not illustrated in FIG. 1. See FIG. 3). Details will be described later.

The fixation unit 125 is disposed on the downstream side of the head unit 124 in the rotation direction of the conveyance drum 121, and irradiates the entire width of the recording sheet S in the main scanning direction with ultraviolet light using, for example, a mercury lamp, thereby curing the ink landed on the recording sheet S and fixing the ink on the recording sheet S.

Note that since energy rays suitable for curing the ink vary depending on characteristics of the ink, it is desirable to use not only the mercury lamp but also an energy ray source corresponding to the characteristics of the ink.

The delivery unit 126 includes a sheet conveyance mechanism in which endless belts 131 are wound around the rollers 129 and 132, and a transfer drum 130. The transfer drum 130 is disposed to face the outer peripheral surface of the conveyance drum 121 on the downstream side of the fixation unit 125 in the rotation direction of the conveyance drum 121, and transfers the recording sheet S carried on the outer peripheral surface of the conveyance drum 121 to the sheet conveyance mechanism of the delivery unit 126.

The sheet conveyance mechanism rotationally drives the rollers 129 and 132 to circulate the belt 131 in an arrow C direction, and conveys the recording sheet S received from the transfer drum 130 to the sheet ejection unit 140.

The sheet ejection unit 140 has a sheet ejection tray 141 and sequentially stacks the recording sheet S conveyed from the image former 120 by the delivery unit 126 on the sheet ejection tray 141. The bundle of recording sheets S stacked on the sheet ejection tray 141 is then collected by the user.

The control unit 150 monitors and controls the state and operation of each unit of the image forming apparatus 1. Further, the control unit 150 receives a print job from an external device such as a personal computer (PC) or makes a notification related to the print job.

The operation panel 160 presents information to the user of the image forming apparatus 1 and receives an instruction input from the user under the control of the control unit 150. Thus, the operation panel 160 includes a display unit such as a liquid crystal panel and an operation unit such as a touch panel or a hard key.

(2) Head Maintenance Unit 200

In the inkjet type image forming apparatus, there is a risk that foreign matters such as dust gets stuck or ink solidifies to cause clogging in the nozzles of the head unit 124, and there is a risk that ink adheres to the nozzle surface when the ink is ejected from the nozzles, and deteriorates image quality or generates dirt on the recording sheet S.

Accordingly, in the present embodiment, the head maintenance unit 200 that cleans the inkjet heads of each head unit 124 at a predetermined timing is provided.

Figure 3:
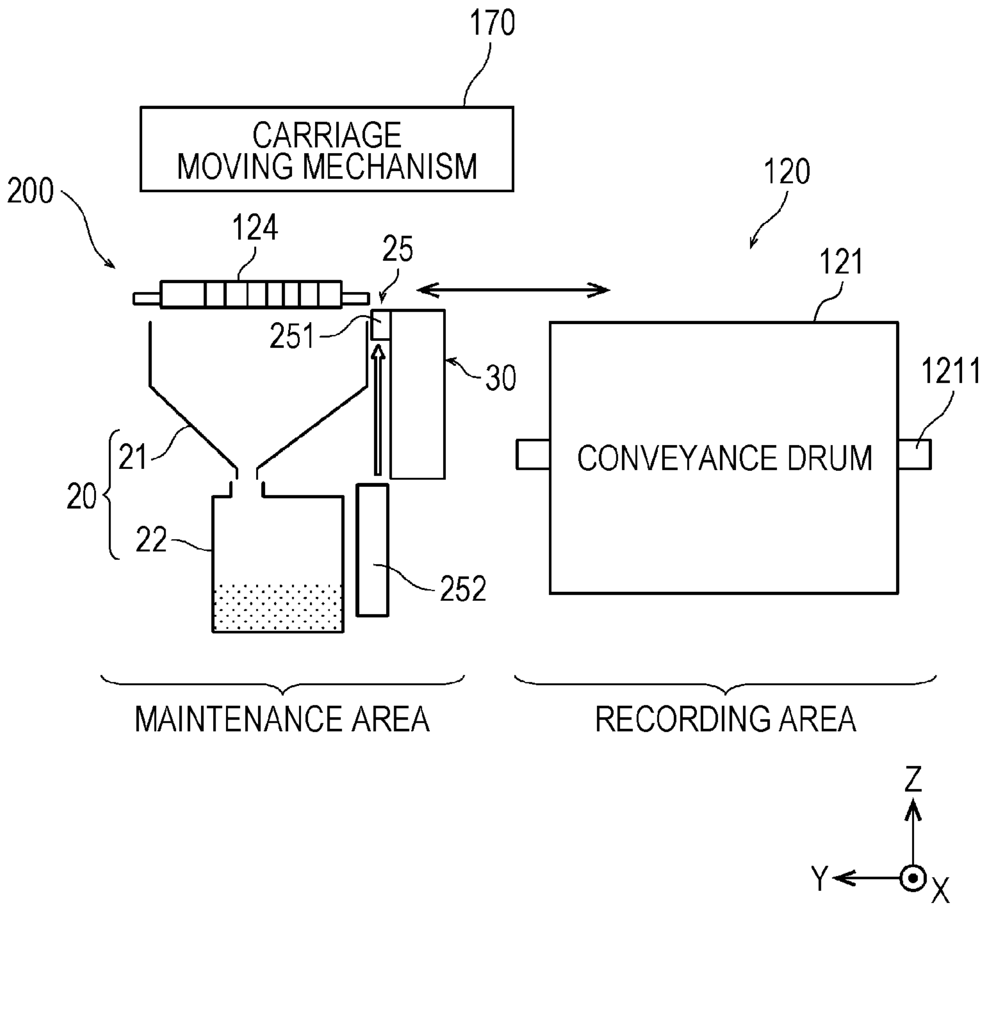
FIG. 3 is a diagram illustrating a main configuration of a head maintenance unit in the image forming apparatus.

FIG. 3 is a schematic diagram illustrating a configuration of the head maintenance unit 200 according to the present embodiment.

As illustrated in the drawing, the head maintenance unit 200 is located in the Y direction (apparatus front side) of the conveyance drum 121 in the image former 120, and includes an ink ejection unit 20, an ink scraping unit 25, and a nozzle surface cleaning unit 30.

The ink ejection unit 20 includes a funnel-shaped ink receiver 21 and an ink tank 22 that collects and stores the ink ejected to the ink receiver 21.

For example, when the power switch of the image forming apparatus is turned on, each head unit 124 is moved from the peripheral surface of the conveyance drum 121 in a recording area to above the ink receiver 21 of the ink ejection unit 20 in a maintenance area by the carriage moving mechanism 170. As the carriage moving mechanism 170, for example, wire driving, a ball screw mechanism, or the like is used.

Then, a predetermined amount of ink is ejected from all the nozzles of the head unit 124 toward the ink receiver 21 to discharge foreign matters and solidified products of ink inside the nozzles (hereinafter referred to as "nozzle inside cleaning"). This prevents clogging of the nozzles.

The ink ejected to the ink receiver 21 is collected in the lower ink tank 22 and periodically discarded. A liquid level sensor may be provided in the ink tank 22, and when the ink liquid level reaches a predetermined height, an indication thereof may be displayed on a display screen of the operation panel 160 to prompt the user to discard the ink in the ink tank 22 or replace the entire ink tank 22.

The ink scraping unit 25 includes a wiper blade 251 and an actuator 252 that vertically drives the wiper blade 251. As the actuator 252, for example, an air cylinder or the like is used, but the actuator 252 is not limited thereto.

The wiper blade 251 is moved upward by the actuator 252 as necessary, and scrapes off ink adhering to the nozzle surface of each inkjet head of the head unit 124 by the nozzle inside cleaning.

The nozzle surface cleaning unit 30 brings a cleaning member in a sheet form (hereinafter referred to as a "cleaning sheet") into contact with the nozzle surface of the head unit 124, and causes the cleaning sheet to absorb the remaining ink that has not been scraped off by the ink scraping unit 25 to thereby remove the ink (hereinafter referred to as "nozzle surface cleaning").

Figure 4A:
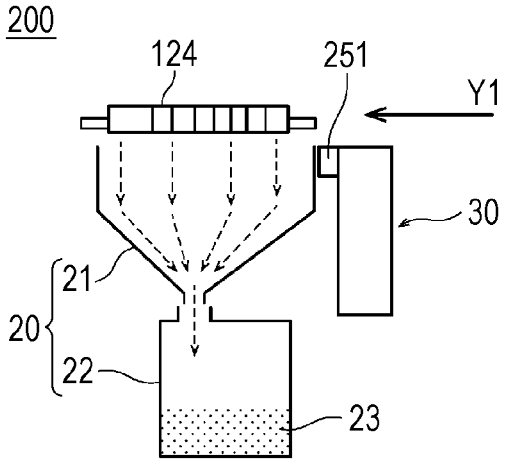
FIGS. 4A to 4C are diagrams illustrating a procedure of head maintenance of the head unit by the head maintenance unit.
Figure 4B:
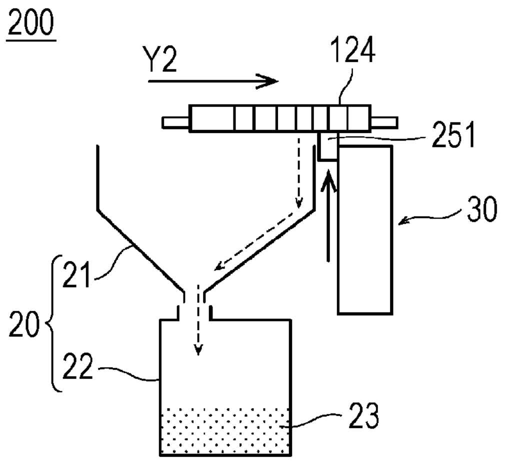
Figure 4C:
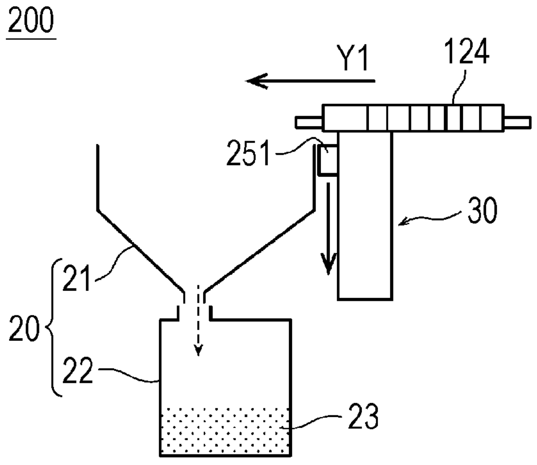

FIGS. 4A to 4C schematically illustrate a procedure of head maintenance in the head maintenance unit 200.

First, the head unit 124 is moved in a Y1 direction from the recording area and positioned above the ink receiver 21 of the ink ejection unit 20, and a predetermined amount of ink is ejected to execute the nozzle inside cleaning (FIG. 4A).

Thereafter, the wiper blade 251 is moved upward, the head unit 124 is moved in a Y2 direction, and the ink adhering to the nozzle surface by the ink ejection is scraped off with the wiper blade 251 (FIG. 4B).

In the present embodiment, the wiper blade 251 is formed by a rigid material such as metal, and the amount of upward movement of the wiper blade 251 is restricted so as to have a slight gap (for example, about 0.5 mm) between a blade tip and the nozzle surface of the head unit 124, so that the nozzle surface is not worn or damaged by the ink scraping process of the wiper blade 251.

When the ink scraping process on the nozzle surface is completed over the entire length in a longitudinal direction of the head unit 124, the wiper blade 251 is lowered, and the nozzle surface cleaning unit 30 performs the nozzle surface cleaning to remove the ink remaining on the nozzle surface of the head unit 124 while intermittently moving the head unit 124 in the Y1 direction by reversing the movement of the head unit in the Y2 direction (FIG. 4C).

Although the maintenance process of one head unit 124 has been schematically described in FIGS. 3 and 4A to 4C, if the maintenance process is performed on the head units 124 of five colors at the same time, the processing time can be shortened and the waiting time of the operator can be shortened, which is reasonable.

For this purpose, the ink ejection unit 20 and the ink scraping unit 25 are provided corresponding to each head unit 124, and as described below, the nozzle surface cleaning unit 30 is also configured to be capable of simultaneously executing the nozzle surface cleaning of the five head units 124.

(3) Configuration of Nozzle Surface Cleaning Unit 30

Figure 5A:
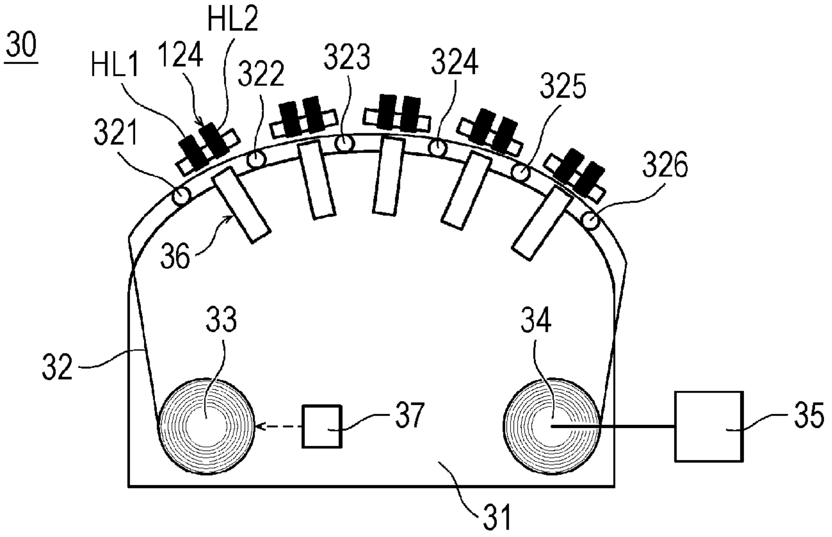
FIGS. 5A to 5C are schematic views for describing a pressing state of a cleaning sheet by a pressing mechanism in a nozzle surface cleaning unit.

FIG. 5A is a schematic view of the nozzle surface cleaning unit 30 as viewed from the left side in the Y axis direction in FIG. 3.

As illustrated in FIG. 5A, the nozzle surface cleaning unit 30 includes a support frame 31 having an upper edge portion in a semicircular shape having substantially the same curvature radius as the conveyance drum 121, a supply roll 33 (first roll) around which an unused belt-shaped cleaning sheet 32 (cleaning member) is wound, a winding roll 34 (second roll) that winds up the used cleaning sheet 32, a driving unit 35 that includes a motor and a gear and rotationally drives the winding roll 34, shaft members 321 to 326 that support and guide the cleaning sheet 32 so that a movement path of the cleaning sheet 32 from the supply roll 33 to the winding roll 34 is a path along the semicircular upper edge portion of the support frame 31, five pressing mechanisms 36 (presser), which are provided corresponding to the respective head units 124 that have been moved to above the nozzle surface cleaning unit 30 by the carriage moving mechanism 170 (FIG. 3), for pushing up and pressing the cleaning sheet 32 against the nozzle surfaces of the inkjet heads of the head units 124, and a distance sensor (diameter detector) 37 for measuring a diameter of the cleaning sheet 32 wound around the supply roll 33 are included.

The control unit 150 adjusts the rotation amount of the winding roll 34 by the driving unit 35 with reference to a detection result of the distance sensor 37. Details will be described later.

The cleaning sheet 32 is a long belt-shaped sheet and is formed by, for example, a cloth material having a strong liquid absorbing property such as microfibers, and the cleaning is performed by absorbing ink remaining on the nozzle surfaces of the head units 124 by pressing the cleaning sheet 32 against the nozzle surfaces by the pressing mechanisms 36.

FIG. 5A illustrates a state where the pressing mechanisms 36 are at initial positions (home positions), and the cleaning sheet 32 is not in contact with the nozzle surfaces of the head units 124.

Figure 5B:
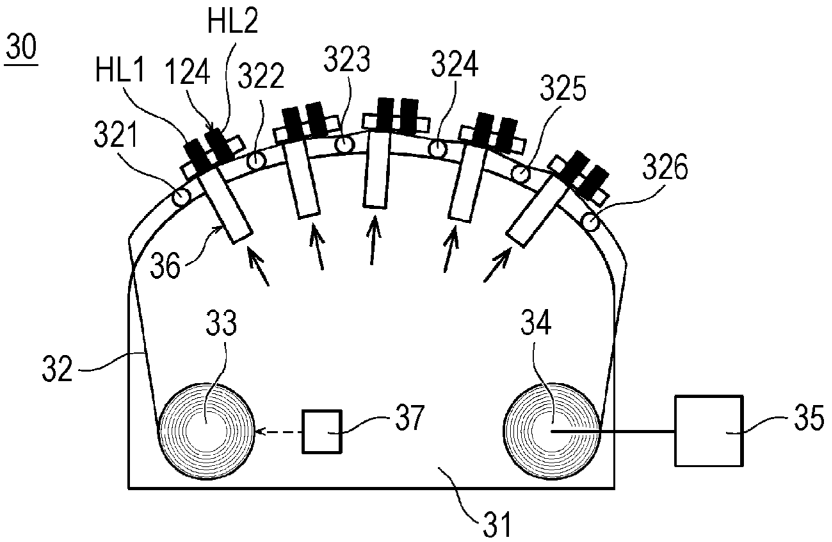

When cleaning the nozzle surfaces of the inkjet heads in the head rows HL1 (see FIGS. 2A and 2B) of the head units 124, as illustrated in FIG. 5B, the pressing mechanisms 36 slightly shift leftward and push up the cleaning sheet 32 at positions corresponding to the nozzle surfaces of the head rows HL1, to bring the nozzle surfaces of the head rows HL1 into contact with the cleaning sheet 32 and clean the nozzle surfaces (first pressing state).

Figure 5C:
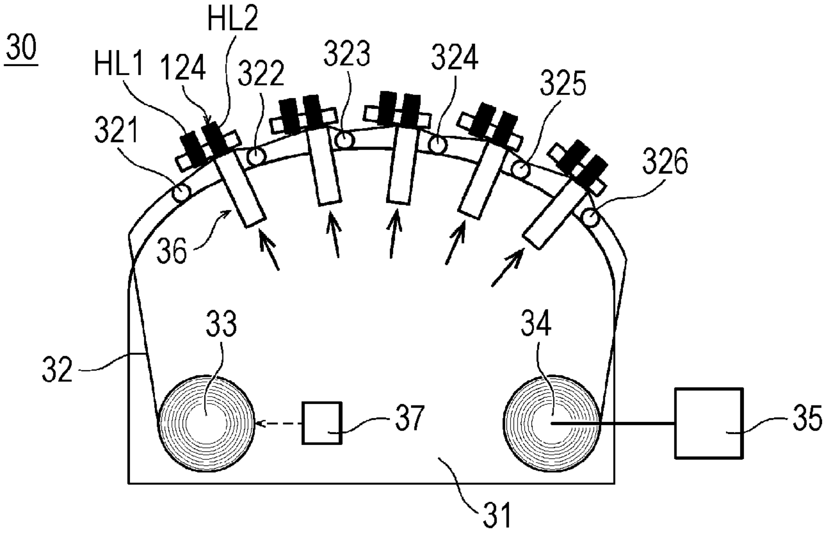

Further, when cleaning the nozzle surfaces of the inkjet heads in the head rows HL2 of the head units 124, as illustrated in FIG. 5C, the pressing mechanisms 36 slightly shift rightward and push up the cleaning sheet 32 at positions corresponding to the nozzle surfaces of the head rows HL2, to bring the nozzle surfaces of the head rows HL2 into contact with the cleaning sheet 32 and clean the nozzle surfaces (second pressed state).

Figure 6:
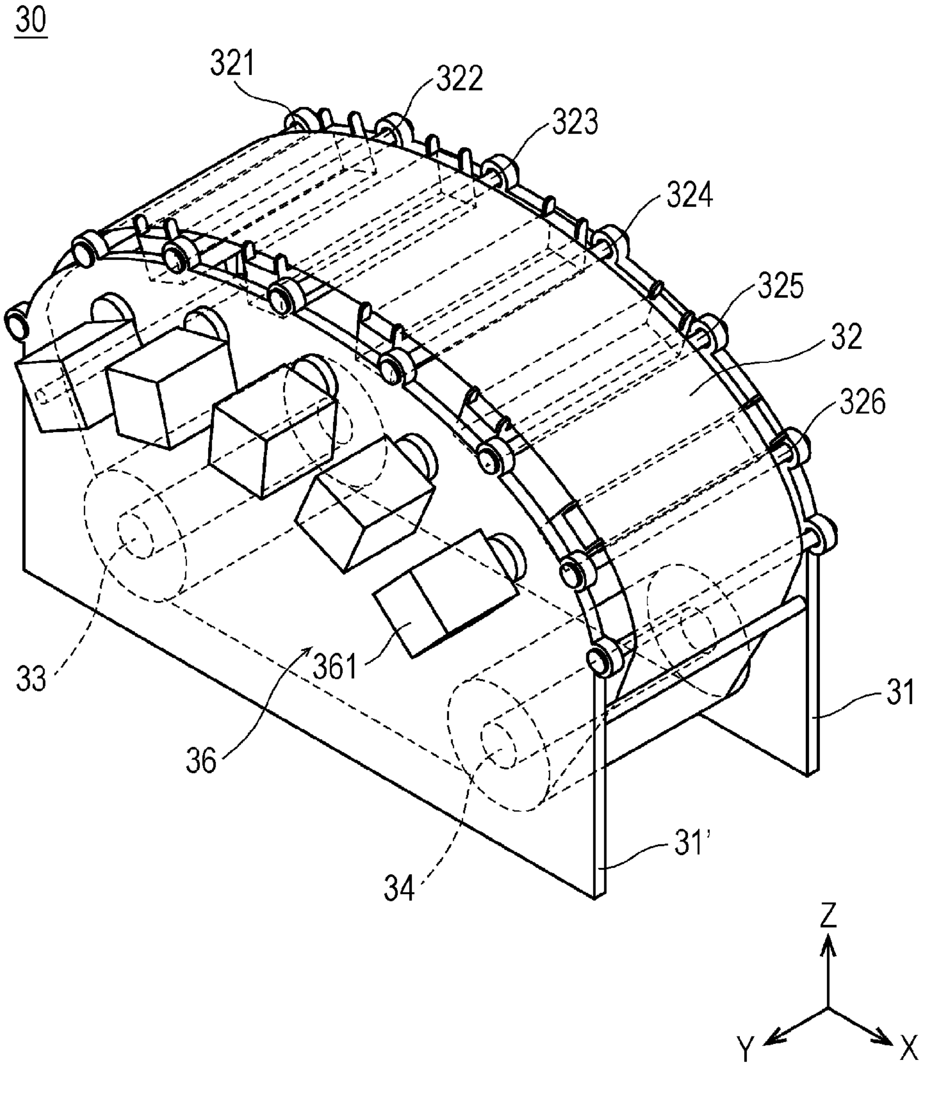
FIG. 6 is an overall perspective view of the nozzle surface cleaning unit.

FIG. 6 is an external perspective view of the nozzle surface cleaning unit 30 described above.

As illustrated in the drawing, the plurality of shaft members 321 to 326 (guide) is disposed parallel to the Y axis at predetermined intervals along substantially semicircular upper edges of the support frames 31 and 31' arranged to face each other at predetermined intervals, and are configured such that the cleaning sheet 32 drawn out from the supply roll 33 is guided by the shaft members 321 to 326 and wound around the winding roll 34.

As described above, since the shaft members 321 to 326 of the cleaning sheet 32 are arranged along the upper edge portions of the support frames 31 and 31' curved upward, a lower surface of the cleaning sheet 32 can be reliably brought into contact with each of the shaft members 321 to 326, the cleaning sheet 32 is hardly twisted, and the shaft members 321 to 326 are supported from below the cleaning sheet 32 and do not come into contact with the portion of the cleaning sheet 32 contaminated with ink, so that the shaft members 321 to 326 will not be contaminated with ink and maintenance is easy.

Note that the units that guide the movement path of the cleaning sheet 32 are not necessarily limited to the shaft members, and may be rollers or the like.

Further, drive motors 361 of the pressing mechanisms 36 are attached to the support frame 31 on the front surface.

Figure 7:
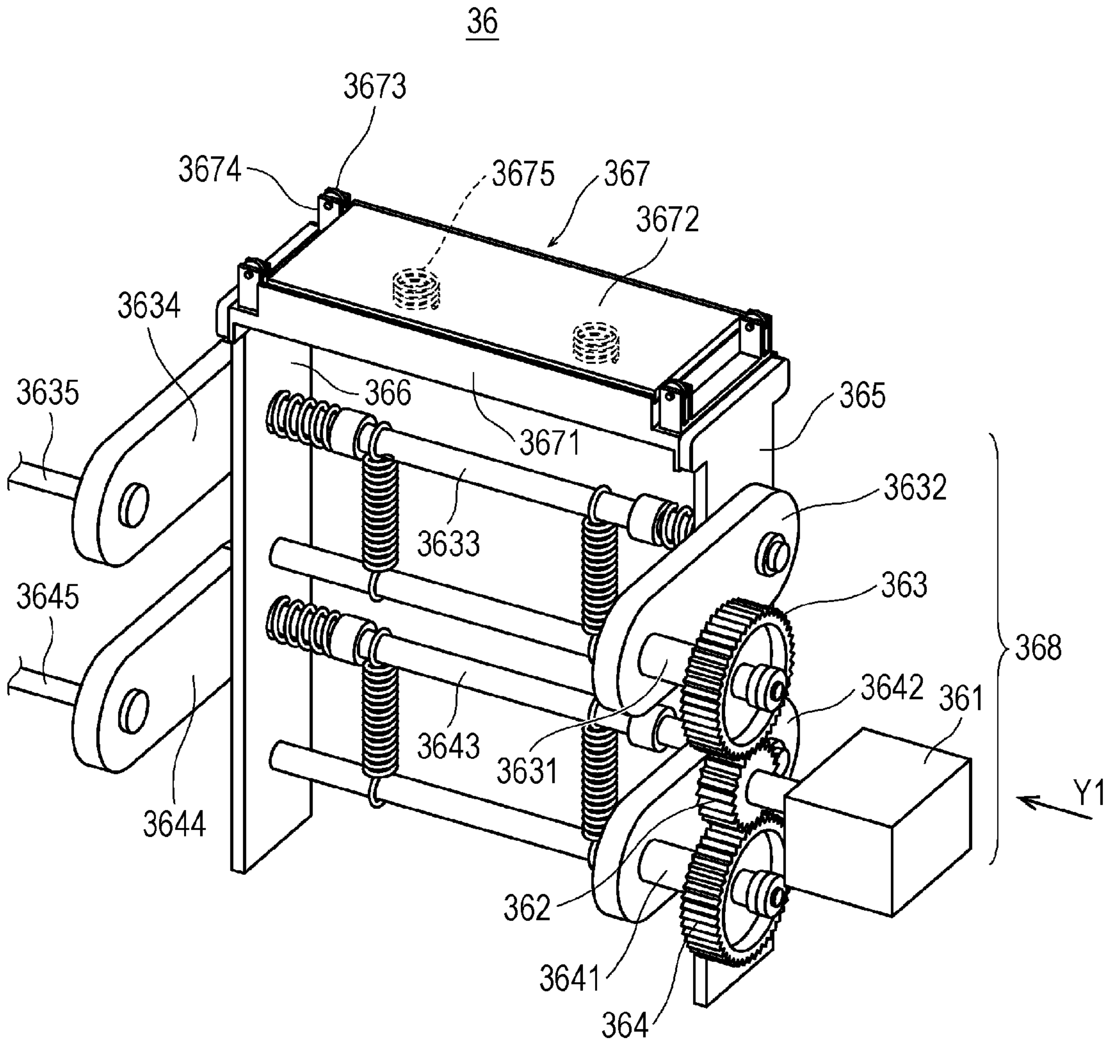
FIG. 7 is a perspective view illustrating a configuration of the pressing mechanism.

FIG. 7 is a perspective view illustrating a configuration example of the pressing mechanism 36 described above.

As illustrated in the drawing, the pressing mechanism 36 includes a movable part 367 in which a holding member 3671 extending in a horizontal direction is attached to upper end portions of a pair of arm members 365 and 366 arranged to face each other in parallel, a plate-shaped contact member 3672 is held above the holding member 3671 with compression springs 3675 interposed therebetween, and a crank mechanism 368 for vertically moving the movable part 367. Note that, instead of the compression springs 3675, other elastic part, for example, a plate spring or a rubber plate may be interposed.

In the crank mechanism 368, cranks 3632 and 3642 are fixed to rotation shafts 3631 and 3641 of gears 363 and 364 that mesh with a gear 362 attached to a drive shaft of the motor 361 and rotate synchronously in the same direction by driving of the motor 361, and also on the arm member 366 side, cranks 3634 and 3644 having the same shapes as the cranks 3632 and 3642 are also axially supported on the support frame 31 by the shafts 3635 and 3645 disposed coaxially with the rotation shafts 3631 and 3641.

Distal end portions of the cranks 3632 and 3634 and distal end portions of the cranks 3642 and 3644 are connected with rods 3633 and 3643 interposed therebetween and penetrating the arm members 365 and 366, respectively, and respective cranks are synchronously rotated by driving of the motor 361, and the arm members 365 and 366 are vertically driven.

Figure 8A:
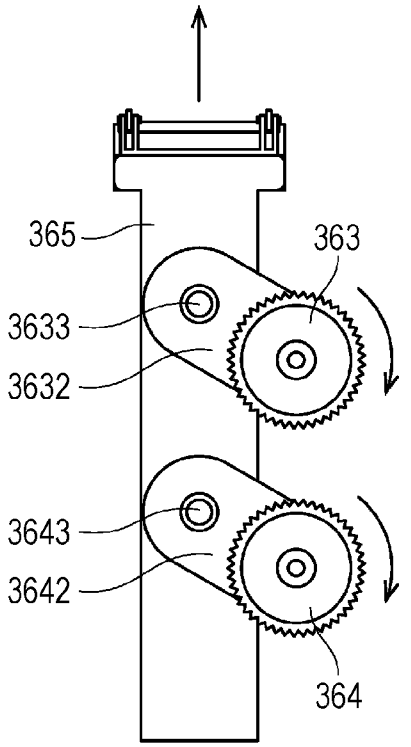
FIGS. 8A and 8B are views for describing a pressing operation by the pressing mechanism.
Figure 8B:
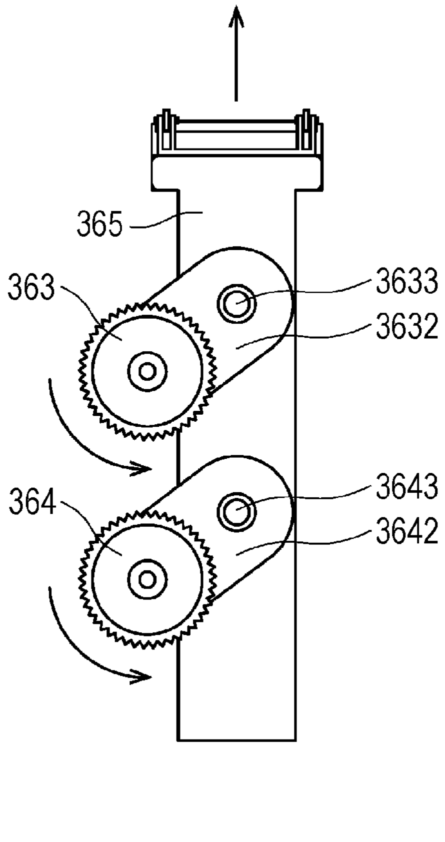

FIGS. 8A and 8B are views illustrating states in which the contact member 3672 is vertically driven via the arm member 365 when the pressing mechanism 36 in FIG. 7 is viewed from an arrow Y1 direction, and the motor 361 and the like are not illustrated.

As illustrated in FIG. 8A, when the gears 363 and 364 rotate to the right by driving of the motor 361, the arm member 365 is rotationally moved upward from the left side (first pressing state: see FIG. 5B).

Further, as illustrated in FIG. 8B, when the gears 363 and 364 rotate to the left by driving of the motor 361, the arm member 365 is moved upward from the right side (second pressing state: see FIG. 5C).

Note that, since the contact member 3672 is supported by the holding member 3671 with the compression springs 3675 interposed therebetween as described above, when the movable part 367 is moved upward, the contact member 3672 comes into surface contact with a back surface of the cleaning sheet 32 and pushes up the cleaning sheet 32 with an appropriate biasing force, and the cleaning sheet 32 is firmly brought into close contact with the nozzle surface of the head unit 124 and can sufficiently absorb the ink.

Further, at each of four corners of the holding member 3671, a top 3673 is pivotally supported by a support piece 3674. A length of the holding member 3671 in a longitudinal direction is larger than a width of the cleaning sheet 32, and when the movable part 367 rises and the contact member 3672 presses the back surface of the cleaning sheet 32, a part of an upper portion of the top 3673 slightly projects upward on the outside in a width direction of the cleaning sheet 32 and comes into contact with a back surface of the carriage 1240 of the head unit 124, so that the distance to the nozzle surface of the head unit 124 is restricted to prevent a pressing force of the contact member 3672 against the cleaning sheet 32 from becoming excessive.

Further, rotation of the top 3673 also operates to smoothly move the head unit 124 in a longitudinal direction (Y axis direction in FIG. 6: a direction orthogonal to the moving direction of the cleaning sheet 32).

(4) Configuration of Control Unit 150

Figure 9:
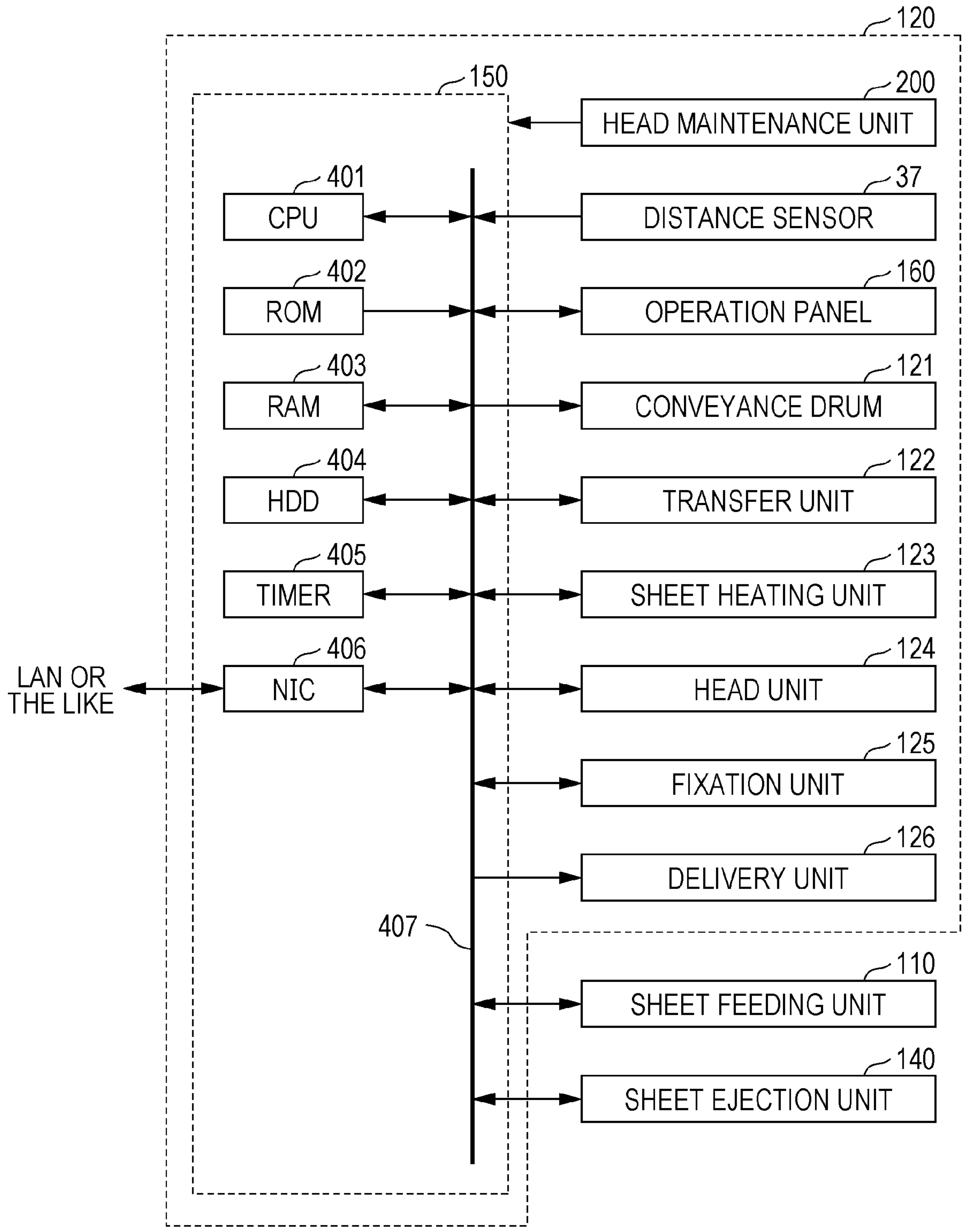
FIG. 9 is a block diagram illustrating a configuration of a control unit in the image forming apparatus.

FIG. 9 is a block diagram illustrating a configuration of the control unit 150 of the image forming apparatus 1.

As illustrated in the drawing, the control unit 150 includes a central processing unit (CPU) 401, a read only memory (ROM) 402, a random access memory (RAM) 403, a hard disk drive (HDD) 404, a timer 405, and a network interface card (NIC) 406.

The CPU 401, the ROM 402, and the like are communicably connected to each other via an internal bus 407.

When the image forming apparatus 1 is reset by being powered on or the like, the CPU 401 reads and activates a boot program from the ROM 402, and reads and executes an operating system (OS), a control program, and the like from the HDD 404 using the RAM 403 as a working storage area.

Consequently, the control unit 150 monitors and controls an operation state of each unit of the image forming apparatus 1.

Note that, instead of the ROM 402, a rewritable nonvolatile memory such as an electrically erasable programmable read only memory (EEPROM) or a flash memory may be used. Further, the RAM 403 may be a nonvolatile memory.

The timer 405 executes timing processing required when the CPU 401 executes a program such as a control program. In particular, an elapsed time after execution of an image forming job is recorded, and the CPU 401 is notified when a predetermined time has elapsed. Upon receiving this notification, the CPU 401 controls the head maintenance unit 200 to execute the head maintenance process, for example.

The NIC 406 executes a communication process for the control unit 150 to receive a print job including image data from an external device such as a PC. The NIC 406 may perform communication via a local area network (LAN) or the Internet.

Further, the NIC 406 may be a serial interface such as a universal serial bus (USB) or a parallel interface.

The control unit 150 controls a drive signal input to a conveyance drum drive motor, which is not illustrated, to thereby rotate the conveyance drum 121 at a predetermined speed and timing, and the control unit 150 controls operations of the sheet feeding unit 110 and the transfer unit 122 to supply the recording sheet S to the conveyance drum 121 and controls an operation of the delivery unit 126 to discharge the recording sheet S to the conveyance drum 121. The control unit 150 forms an image on the recording sheet S by energizing and deforming the piezoelectric elements corresponding to the nozzles so that appropriate amounts of ink are ejected from respective nozzles of the inkjet heads constituting the head units 124 of the image former 120 at an appropriate timing according to the image data.

Further, at a predetermined timing, each unit of the head maintenance unit 200 is controlled to execute maintenance (head maintenance process) of the head units 124.

(5) Head Maintenance Control by Control Unit 150

Figure 10:
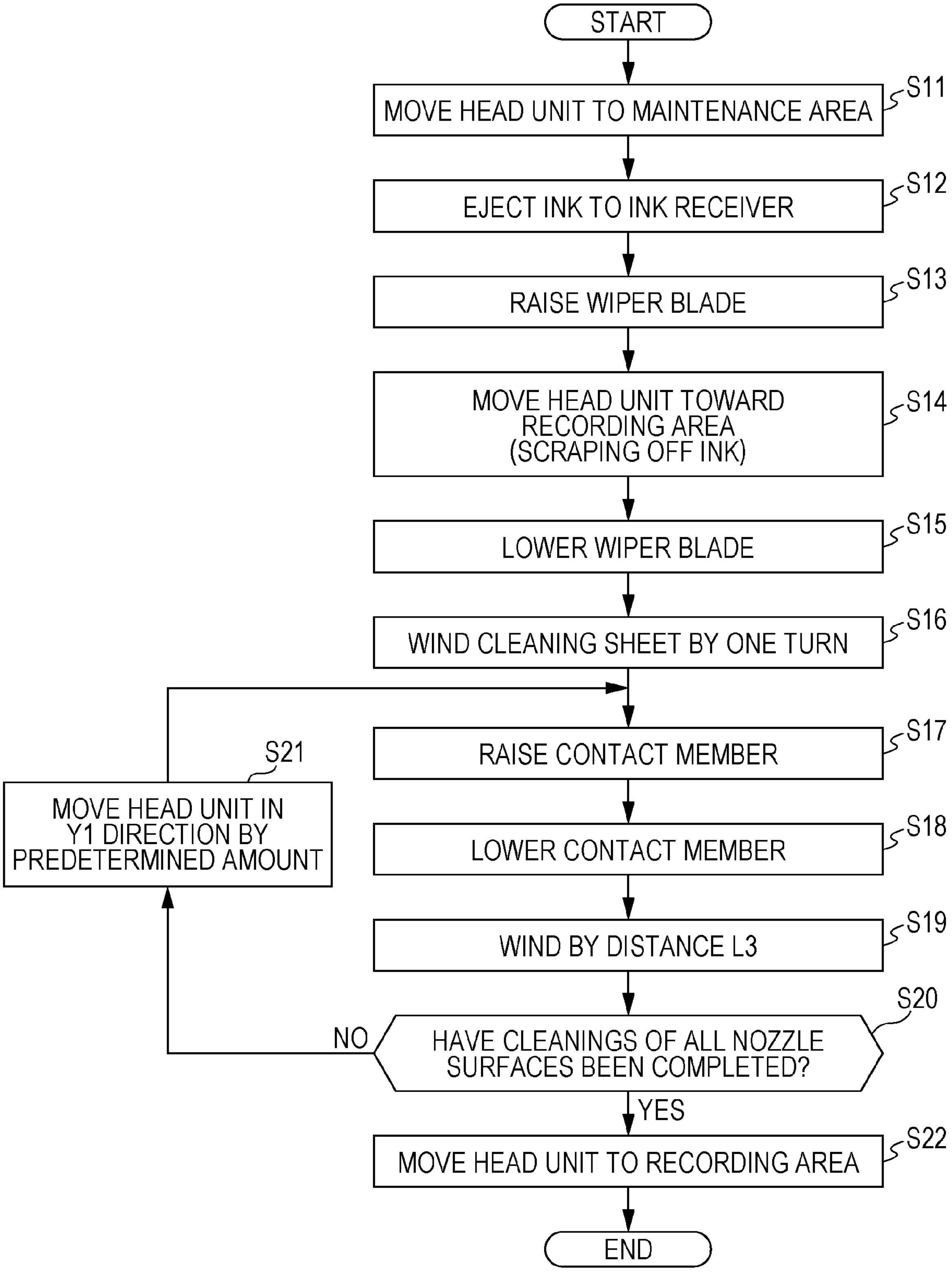
FIG. 10 is a flowchart illustrating a procedure of control of a head maintenance process executed by the control unit.

FIG. 10 is a flowchart for describing control of a head maintenance process executed by the control unit 150.

The control of the head maintenance process is executed at a timing when the head maintenance process is required, for example, when the image forming apparatus 1 is powered on, when a long time has elapsed (for example, 3 hours have elapsed) from the execution of the previous image forming job, or when the user notices deterioration in image quality and inputs an execution instruction of head maintenance through the operation panel 160, or the like.

First, the head unit 124 is moved to the maintenance area by the carriage moving mechanism 170 (step S11).

The inkjet heads 1241 to 1248 of the head unit 124 are caused to eject a predetermined amount of ink to the ink receiver 21 to execute the nozzle inside cleaning (step S12: FIG. 4A).

Then, the wiper blade 251 is raised and the head unit 124 is moved toward the recording area to scrape off the ink excessively attached to the nozzle surface with the wiper blade 251 (steps S13 and S14: FIG. 4B).

When the ink scraping process by the wiper blade 251 is completed by the movement of the head unit 124 to the recording area, the movement of the head unit 124 is stopped at a predetermined position, and the wiper blade 251 is lowered (step S15). The stop position of the head unit 124 at this time is set to a position where the nozzle surface to be subjected to the nozzle surface cleaning process first comes on the cleaning sheet 32, so that it is possible to efficiently shift to the subsequent nozzle surface cleaning process.

Next, the cleaning sheet 32 is wound by a path length corresponding to a position immediately downstream of the head unit 124 on the most downstream side from a position immediately upstream of the head unit 124 located on the most upstream side in the moving direction of the cleaning sheet 32, that is, a path length (“one turn”) until a portion that has cleaned the nozzle surface of the head unit 124 on the most upstream side moves to the position immediately downstream of the head unit 124 on the most downstream side (step S16), and then the nozzle surface cleaning process of steps S17 to S21 is started.

In the present embodiment, as one example, a width W11 (see FIG. 11A) of the cleaning sheet 32 is set to be slightly larger than L12, which is twice the nozzle row length L11 in one inkjet head, and an area to be cleaned of the head unit 124 (total distance (L11×8) of the nozzle surfaces of the inkjet heads 12411 to 1248) is equally divided into four, for example, and the cleaning process is executed four times.

At the time of the ink scraping process in step S14, the head unit 124 is stopped so that the inkjet heads 1241 and 1242 exist on the cleaning sheet 32, and then the pressing mechanism 36 is driven to alternately switch to the left and right, raise the contact member 3672, and execute the first and second pressing states (FIGS. 5B and 5C) to thereby clean each of the nozzle surfaces of the inkjet heads belonging to the head rows HL1 and HL2 of the head unit 124 (step S17). Thereafter, the contact member 3672 is lowered to the home position (step S18: FIG. 5A), and then the cleaning sheet 32 is wound by the width of the cleaned portion (distance L3: see FIG. 11A) (step S19).

Note that depending on the wound state of the cleaning sheet 32 by the winding roll 34, even if the cleaning sheet is rotated by the same rotation amount of the winding roll 34, a difference occurs in the winding amount. In order to cope with this, it is sufficient if a winding diameter of the winding roll 34 is detected, and the control unit 150 can adjust the rotation amount of the winding roll 34 necessary for winding the cleaning sheet 32 by the target amount according to the size of the diameter.

Since the winding diameter of the winding roll 34 and a winding diameter of the supply roll 33 have a correlation, in the present embodiment, the distance to the surface of the cleaning sheet 32 wound around the supply roll 33 is measured by the distance sensor 37, and the control unit 150 controls the winding amount of the winding roll 34 by this measurement value.

Such control is executed, for example, by storing, in the ROM 402 in advance, a table indicating a relationship between the value of the diameter of the supply roll 33 and the rotation amount of the winding roll 34 necessary for moving the cleaning sheet 32 by a necessary length, and the CPU 401 controls the rotation of the winding roll 34 while referring to the table. Of course, the winding diameter of the winding roll 34 may be directly detected and controlled.

In the present embodiment, an optical distance sensor is used as the distance sensor 37, but other known sensors may be used as long as the winding diameter of the cleaning sheet 32 of the supply roll 33 or the winding roll 34 can be detected.

Next, in step S20, it is determined whether or not cleanings of all the nozzle surfaces of the head unit 124 have been completed (step S20), and if not completed (NO in step S20), the head unit 124 is moved by a predetermined amount (in the present embodiment, a length L12 (=L11×2) that is ¼ of the entire length of the nozzle row of the head unit 124) in the Y1 direction (FIG. 4C) by the carriage moving mechanism 170 (step S21), and the process returns to step S17 to clean the next nozzle surface.

The determination in step S20 can be made, for example, by counting how many times the routines in steps S17 to S20 have been repeated by the control unit 150 (in the present embodiment, when the routine is repeated four times, it is determined that the cleanings of all nozzle surfaces have been completed).

When the cleanings of all the nozzle surfaces in the head unit 124 have been completed (YES in step S20), the nozzle surface cleaning process of the head unit 124 is finished, the carriage 1240 is moved to the recording area on the conveyance drum 121 by the carriage moving mechanism 170 (step S22), and the head maintenance process is finished.

Note that the position where the winding process of the cleaning sheet 32 is executed in step S19 described above may be between step S20 and step S21 or between step S21 and step S17.

The head maintenance process described above is executed simultaneously for all the head units 124 of the five colors.

Figure 11A:
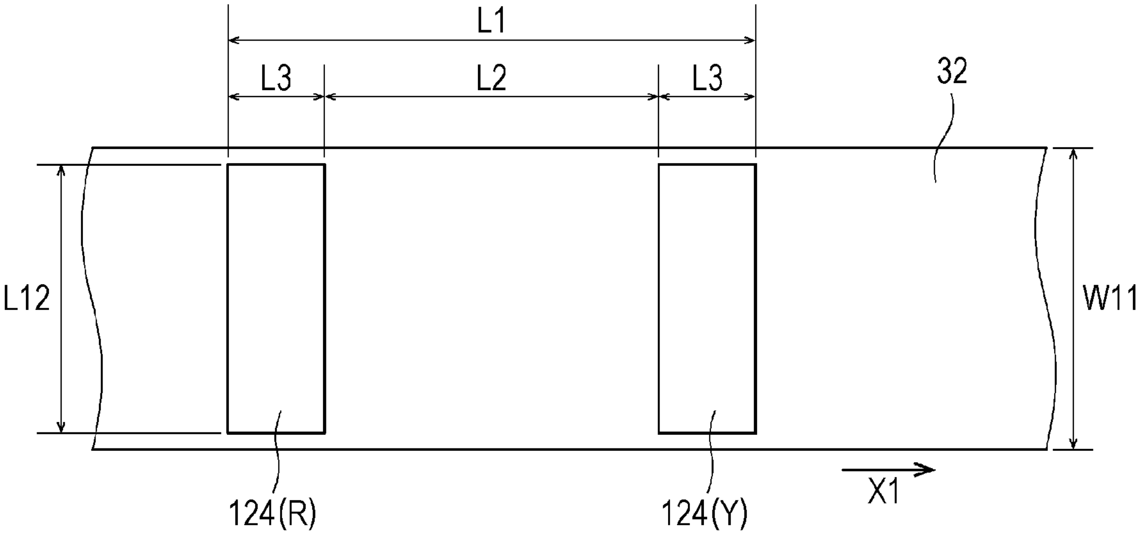
FIGS. 11A to 11C are views for describing a moving amount of the cleaning sheet during a nozzle surface cleaning operation according to the present embodiment.
Figure 11B:
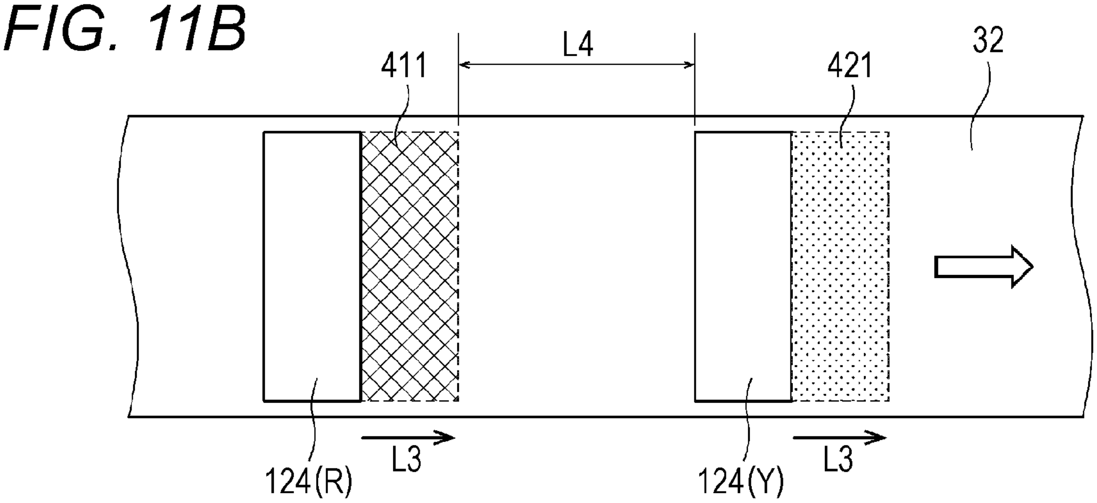
Figure 11C:
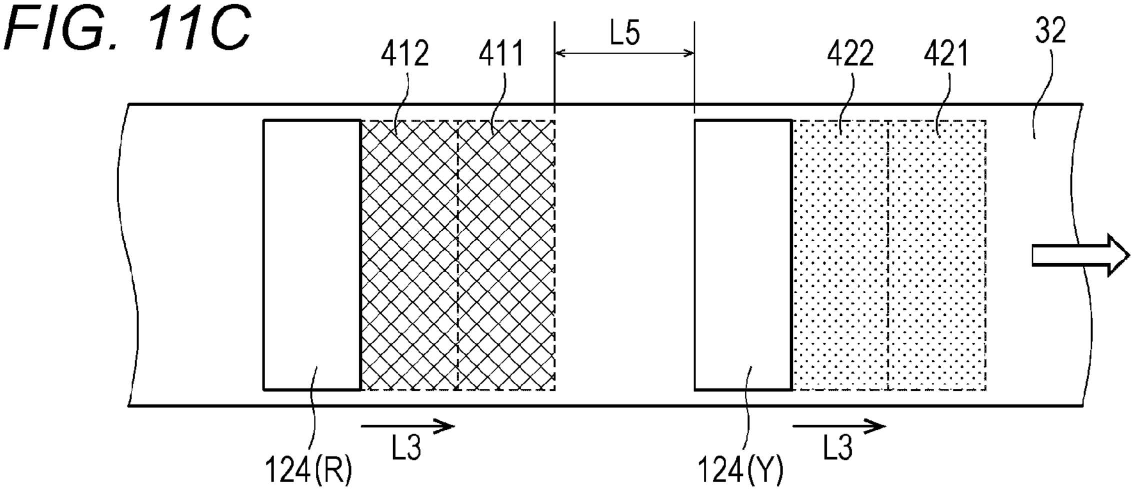

FIGS. 11A to 11C are views schematically illustrating an effect of the control (step S19) of the moving amount (winding amount) of the cleaning sheet 32 in the nozzle surface cleaning unit 30 according to the present embodiment.

In the drawing, 124(R) and 124(Y) respectively indicate an area where the nozzle surface to be cleaned by the head unit 124 for R color ink ejection exists and an area where the nozzle surface to be cleaned by the head unit 124 for Y color ink ejection exists.

Then, L1 represents a path length from an edge portion on the upstream side in a moving direction X1 of the cleaning sheet in an area 124(R) to an edge portion on the downstream side in the X1 direction in an area 124(Y).

Further, L2 represents a path length of the cleaning sheet 32 in the X1 direction between the area 124(R) and the area 124(Y), and L3 represents widths of the area 124(R) and the area 124(Y) in the X1 direction.

According to the present example, movement by L3 in the X1 direction is made for each of the second time and third time of nozzle surface cleaning after the first time of nozzle surface cleaning (see FIGS. 11B and 11C. Note that 411, 421, and the like in FIGS. 11B and 11C each indicate a rectangular area including a previous cleaning area in the cleaning sheet 32). In particular, although not illustrated, the fourth time is operated similarly.

In the related art, in a case where there are two inkjet heads, since the inkjet heads are moved by the path length L1 for each time of nozzle cleaning in FIG. 11A, the portion of the path length L2 between the area 124(R) and the area 124(Y) is wound in an unused state, by which there is much waste and it is necessary to frequently replace the cleaning sheet 32. However, in a case of the present embodiment, the unused portion can be reduced and the maintenance cost can be reduced.

Note that in the present embodiment, while the area 124(R) and the area 124(Y) are moved by the width L3 in the X1 direction, even if the moving amount of the cleaning sheet 32 is larger than the width L3, when movement is made by a shorter distance than a path length between the cleaning area of the nozzle surface of the head unit 124 on the upstream side and the cleaning area of the nozzle surface of the head unit 124 adjacent on the downstream side in the previous cleaning operation (that is, a path length from a portion where the nozzle surface of the head unit 124 (first ejection head) on the upstream side is cleaned to a portion where the nozzle surface of the head unit 124 (second ejection head) on the downstream side is cleaned. Hereinafter, it is abbreviated as "length between cleaned areas". Specifically, L2 in FIG. 11A, L4 in FIG. 11B, and L5 in FIG. 11C correspond to this length), an unused portion of the cleaning sheet 32 can be reduced as compared with at least the conventional movement control of the cleaning sheet 32, which contributes to reduction of the maintenance cost.

In this case, it is desirable that the distance is shorter than the length between the cleaned areas and at least a nozzle surface cleaning area of the head unit 124 on the upstream side is in a range not overlapping the nozzle surface area on the downstream side, and this is because, even in a case where there is a slight overlap, an unused portion always exists in the next cleaning scheduled area, so that the cleaning effect can be secured to some extent (for example, referring to FIG. 11C, cleaned areas 411 and 412, and 421 and 422 may slightly overlap each other). However, it is desirable that the cleaned areas of different color inks on the cleaning sheet 32 do not overlap (for example, referring to FIG. 11C, a state in which the cleaned area 411 of R and the cleaned area 422 of Y partially overlap each other). This is because the nozzle surface for the ink of a specific color may be contaminated with the ink of another color, and the image quality may be deteriorated.

(6) Another Example of Nozzle Surface Cleaning Process

In the above-described example of the nozzle surface cleaning process (steps S17 to S21 in FIG. 10), as an example, the entire nozzle length in the longitudinal direction of the head unit 124 (the sum of all the nozzle surfaces in the longitudinal direction) is equally divided into four, and the cleaning process is repeated four times to clean all the nozzle surfaces of the head unit 124 while moving the head unit 124 in the Y1 direction by L12 (=2×L11). By dividing into a plurality in this manner, the width W11 of the cleaning sheet 32 can be further reduced accordingly, which can contribute to downsizing and cost reduction of the device.

In order to pursue this advantage, a procedure in a case where the total nozzle length of the head unit 124 is equally divided into eight and cleaning is performed while moving the head unit 124 in the Y1 direction by L11 is described below corresponding to steps S14 and S17 to S21 in FIG. 10.

(A) First, in step S14, when the wiper blade 251 finishes scraping the ink, the nozzle surface of the inkjet head 1241 of the head unit 124 is positioned directly above the cleaning sheet 32.

(B) Then, in step S17, the contact member 3672 of the pressing mechanism 36 is raised to the first pressing state, and the cleaning of the nozzle surface of the inkjet head 1241 (head HL1) is executed.

(C) Thereafter, the contact member 3672 is lowered (step S18), and the cleaning sheet 32 is wound by a predetermined distance (step S19).

As described in FIG. 2B, the head row HL1 and the head row HL2 of the head unit 124 according to the present embodiment have the gap of G1 in the X direction, and since the gap of G1 and the width of the nozzle surface (strictly speaking, the nozzle surface including the nozzle rows of the inkjet head modules 1241*a* and 1241*b* in the inkjet head) of each inkjet head in the X direction are equal, the winding amount of the cleaning sheet 32 is set to the size of the gap G1 between the head rows HL1 and HL2 in the present example.

By this setting, the portion of the cleaning sheet 32 corresponding to the gap G1 can also be used for cleaning the nozzle surface, so that the cleaning sheet 32 can be further used without waste, which contributes to further cost reduction.

(D) Next, in step S20, it is determined whether or not the cleanings of all the nozzle surfaces of the head unit 124 have been completed (step S20), and if not completed (NO in step S20), the head unit 124 is moved by L11 in the Y1 direction (FIG. 4C) by the carriage moving mechanism 170 (step S21), and the process returns to step S17 to clean the next nozzle surface (here, the nozzle surface of the inkjet head 1242 of the head HL2: FIG. 2B) by bringing the pressing mechanism 36 into the second pressing state.

(E) The operations of steps S17 to S21 described above are repeated until the cleanings of all the nozzle surfaces of all the inkjet heads 1241 to 1248 of the head unit 124 are completed, and when the cleanings of all the nozzle surfaces in the head unit 124 have been completed (YES in step S20), the cleanings of the eight nozzle surfaces of the head unit 124 are thereby completed.

Also in the present example, the above-described position of the winding process of the cleaning sheet 32 in step S19 described above may be between step S20 and step S21 or between step S21 and step S17.

According to the present example, since the cleaning sheet 32 is wound and moved by the distance G1 smaller than the width L3 of the head unit 124, for example, in the areas 411 and 412 and the areas 421 and 422 in FIG. 11B, there are areas overlapping each other in the X axis direction, and all the nozzle surfaces of the inkjet heads 1241 to 1248 of the head unit 124 can be sufficiently cleaned within the range of L3+L2 of FIG. 11A.

Furthermore, in a case of the present example, the width W11 (FIG. 11A) of the cleaning sheet 32 can be thinned to substantially the same size as the length L11 of the nozzle row in one inkjet head, and thus further miniaturization and cost reduction can be achieved.

Modification Example

Although the present disclosure has been described on the basis of the embodiments, it is needless to mention that the present disclosure is not limited to the above-described embodiments, and the following modification examples can be implemented.

(1) In the above-described embodiment, a case of using an energy ray irradiation type ink has been described as an example, but it is needless to mention that the present disclosure is not limited thereto, and other types of ink or liquid other than ink may be used instead.

(2) In the above-described embodiment, microfibers are exemplified as the material of the cleaning sheet 32, but an optimum material may be appropriately used according to the material of the ink to be used.

(3) If the path length of the cleaning sheet 32 between the portions corresponding to the nozzle surfaces of the head units 124 adjacent in the moving direction of the cleaning sheet 32 (corresponding to the path length L1 in FIG. 11A) is increased as much as possible, the number of times cleaning can be performed between the portions increases, which is desirable.

In particular, in a case where there is a plurality of inkjet heads in the longitudinal direction of one head unit 124 and the head unit 124 is cleaned by dividing into a plurality of times (at least twice), it is desirable to determine the interval between the adjacent head units 124 so that the path length L1 necessary for cleaning the head unit 124 can be secured by the number of times.

Figure 12:
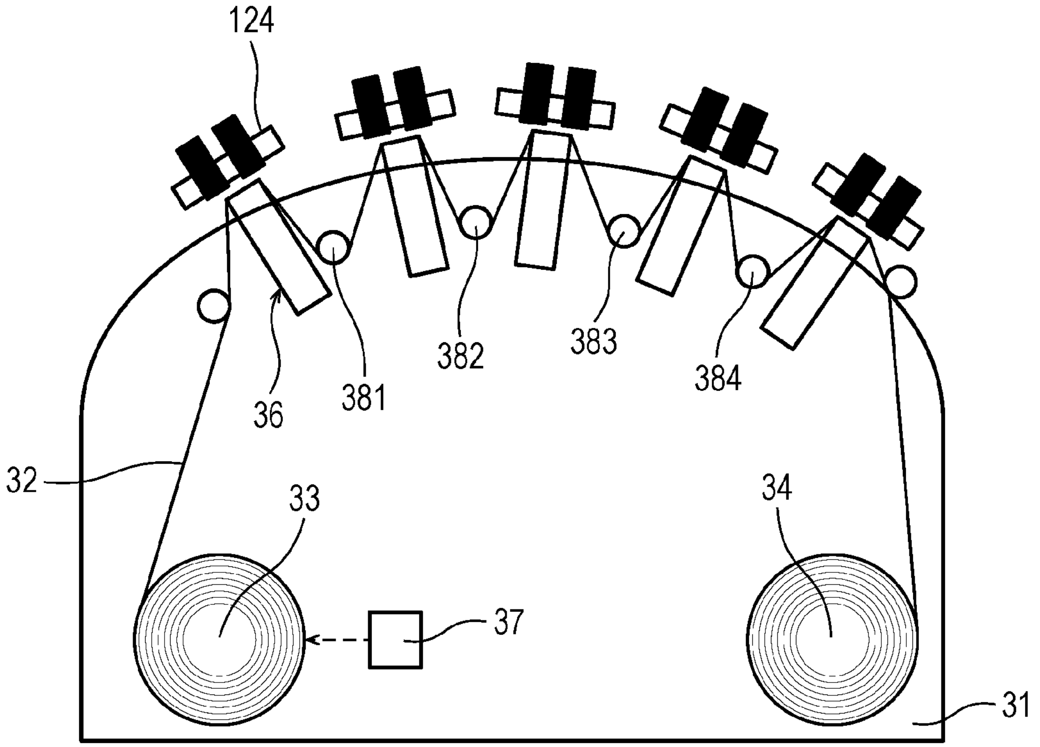
FIG. 12 is a schematic view illustrating a modification example of the nozzle surface cleaning unit.

However, since it may be difficult to increase the interval between the adjacent head units 124 in terms of design, for example, as illustrated in FIG. 12, shaft members (guide) 381 to 384 may be arranged so that the movement path of the cleaning sheet 32 between the adjacent head units 124 is formed in a V shape. Furthermore, the number of shaft members may be increased to form a W-shaped movement path.

(4) Furthermore, if the path length of the cleaning sheet 32 of the portion corresponding to the nozzle surfaces of the adjacent head units 124 is set to be exactly a natural number multiple of the winding amount (moving amount) ("L3" or "G1" in FIG. 11A) of the cleaning sheet 32 necessary for each time of nozzle surface cleaning operation, the unused portion of the cleaning sheet 32 can be reduced as much as possible, which further contributes to the reduction of the maintenance cost.

(5) Furthermore, a tension applicator that applies tension in the longitudinal direction to the cleaning sheet 32 guided by the shaft members 321 to 326 may be provided. Consequently, wrinkles are less likely to be generated at the portion where the cleaning sheet 32 is pressed against the nozzle surface of the head unit 124 and the adhesion is increased, and the cleaning effect is increased.

As such a tension applicator, it is only required to attach a torque limiter to the rotation shaft of the supply roll 33 so that the supply roll 33 does not rotate unless a certain torque or more is reached, and provide a tension roller in the middle of the movement path of the cleaning sheet 32 so as to bias the tension roller in a direction in which tension is generated in the cleaning sheet 32 by an elastic material such as a spring.

In addition, the supply roll 33 may be loaded with torque in the rotation direction opposite to the pull-out direction of the cleaning sheet 32 by a motor.

(6) In the above-described embodiment, the extending direction of the nozzle row in the head unit 124 and the moving direction of the cleaning sheet 32 are orthogonal to each other, but the directions are not necessarily orthogonal to each other and are only required to intersect each other to enable reduction of the width of the cleaning sheet 32 used in one cleaning operation to some extent.

(7) In the above-described embodiment, the case where the corresponding nozzle surfaces of the five head units 124 are simultaneously cleaned by one cleaning operation has been described, but the respective nozzle surfaces of the head units 124 may be configured to be capable of being individually cleaned by, for example, using a separate drive source for each unit of the head maintenance unit 200, or the like.

For example, in a case where the operator determines that the image quality has deteriorated for a specific color, by instructing to execute the cleaning only for the head unit 124 of the specific color via the operation panel 160 or the like, the head unit 124 of another color does not need to be unnecessarily dry-cleaned, and thus the ink and the cleaning sheet can be saved.

(8) In the above-described embodiment, the width of the cleaning sheet 32 is slightly larger than the length in the longitudinal direction of the head unit 124 that can be cleaned by one cleaning operation (see FIG. 11A).

However, by moving the head unit 124 in the longitudinal direction in a state where the cleaning sheet 32 is pressed by the pressing mechanism 36, it is also possible to perform cleaning so as to wipe the ink on the nozzle surfaces with the cleaning sheet 32, and thus, in such a case, the width of the cleaning sheet 32 does not necessarily need to be larger than the length in the longitudinal direction of the head unit 124 that can be cleaned by one cleaning operation.

(9) In the above-described embodiment, a case where the nozzle surface cleaning unit 30 is disposed in the inkjet type image forming apparatus 1 has been described as an example, but the present disclosure is not limited thereto, and as long as the apparatus includes an ejection head that ejects liquid from a nozzle, application of the present disclosure contributes to reduction of maintenance cost related to cleaning of the nozzle surfaces of the ejection head.

(10) In the above-described embodiment, the five head units 124 that eject the ink of five colors are provided, but the number of colors is not limited thereto, and may be six or more colors and, in some cases, may be only one color.

In addition, if at least two head units 124 to be cleaned are disposed at intervals in the moving direction of the cleaning sheet 32, the effect of reducing the maintenance cost by the nozzle surface cleaning according to the present disclosure can be obtained.

(11) The above-described embodiments and modification examples are merely examples of implementation for carrying out the present disclosure, and the technical scope of the present disclosure should not be interpreted in a limited manner by these examples. The present disclosure can be implemented in various modes without departing from the gist or main features thereof.

The present disclosure contributes to reduction of maintenance cost in head cleaning of an apparatus using an ejection head.

Although embodiments of the present invention have been described and illustrated in detail, the disclosed embodiments are made for purposes of illustration and example only and not limitation. The scope of the present invention should be interpreted by terms of the appended claims.

What is claimed is:

1. A head cleaning device, comprising:

a cleaning member that comes into contact with nozzle surfaces of a first ejection head and a second ejection head arranged at intervals and cleans the nozzle surfaces; and a mover that moves, after completion of a previous cleaning and before start of a next cleaning, the cleaning member by a distance shorter than a path length from a portion that has cleaned the nozzle surface of the first ejection head to a portion that has cleaned the nozzle surface of the second ejection head up to the previous cleaning.

2. The head cleaning device according to claim 1, wherein a moving direction of the cleaning member by the mover is a direction intersecting a direction in which nozzle rows of the first and second ejection heads extend.

3. The head cleaning device according to claim 1, further comprising a tension applicator that applies tension to the cleaning member in a longitudinal direction of the cleaning member.

4. The head cleaning device according to claim 1, further comprising a presser that presses a portion of the cleaning member corresponding to the nozzle surfaces of the first and second ejection heads toward the nozzle surfaces during a cleaning.

5. The head cleaning device according to claim 4, wherein the presser includes an elastic part that biases a contact part, that comes in contact with the cleaning member, toward the cleaning member.

6. The head cleaning device according to claim 4, wherein the presser is capable of individually pressing a portion of the cleaning member corresponding to the nozzle surface of each of the first and second ejection heads.

7. The head cleaning device according to claim 1, wherein the first and second ejection heads are used to eject inks of different colors.

8. The head cleaning device according to claim 1, wherein the cleaning member is a belt-shaped sheet member, and the mover includes a first roll around which a cleaning member before use is wound, a second roll around which a used cleaning member is wound, and a driver that rotationally drives the second roll.

9. The head cleaning device according to claim 8, further comprising a detector that detects a diameter of the cleaning member wound around the first roll or a diameter of the cleaning member wound around the second roll, wherein the driver adjusts a rotation amount of the second roll during movement of the cleaning member on a basis of the diameter detected by the detector.

10. The head cleaning device according to claim 1, wherein cleanings of the nozzle surfaces of the first and second ejection heads are performed simultaneously.

11. The head cleaning device according to claim 1, further comprising a guide that guides the cleaning member in such a manner that a movement path of the cleaning member between the first and second ejection heads has a V shape or a W shape.

12. The head cleaning device according to claim 1, wherein the first ejection head is located upstream of the second ejection head in a moving direction of the cleaning member, and a path length of a cleaning member existing between the first ejection head and the second ejection head is equal to or more than N times (N is an integer of 2 or more) a width in the moving direction of the cleaning member necessary for cleaning the nozzle surface of the second ejection head in one cleaning operation.

13. An image forming apparatus comprising an image former that ejects ink from a first ejection head and a second ejection head onto a recording sheet to form an image, and a head cleaner that cleans respective nozzle surfaces of the first and second ejection heads, wherein the head cleaning device according to claim 1 is used as the head cleaner.

14. A head cleaning method in a head cleaning device including a cleaning member that comes into contact with nozzle surfaces of a first ejection head and a second ejection head arranged at intervals and cleans the nozzle surfaces, the head cleaning method comprising moving, after completion of a previous cleaning and before start of a next cleaning, the cleaning member by a distance shorter than a path length from a portion that has cleaned the nozzle surface of the first ejection head to a portion that has cleaned the nozzle surface of the second ejection head up to the previous cleaning.

* * * * *